United States Patent
Baek et al.

(10) Patent No.: US 9,966,582 B2
(45) Date of Patent: May 8, 2018

(54) TENSIONING BATTERY PACK ENCLOSURE

(71) Applicant: FORD GLOBAL TECHNOLOGIES, LLC, Dearborn, MI (US)

(72) Inventors: Hyung Min Baek, Ann Arbor, MI (US); Sai K. Perumalla, Rochester Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 123 days.

(21) Appl. No.: 14/805,891

(22) Filed: Jul. 22, 2015

(65) Prior Publication Data
US 2017/0025651 A1   Jan. 26, 2017

(51) Int. Cl.
*H01M 2/10* (2006.01)

(52) U.S. Cl.
CPC ...... *H01M 2/1077* (2013.01); *H01M 2220/20* (2013.01)

(58) Field of Classification Search
None
See application file for complete search history.

(56) References Cited

U.S. PATENT DOCUMENTS

| 8,835,042 B2 | 9/2014 | Heo |
| 2006/0121343 A1 | 6/2006 | Shu |
| 2007/0138697 A1* | 6/2007 | Takeda ............ B29C 45/14221 264/278 |
| 2010/0167115 A1* | 7/2010 | Okada ................ H01M 2/1077 429/99 |
| 2012/0148889 A1* | 6/2012 | Fuhr .................... H01M 2/1077 429/87 |
| 2013/0183571 A1* | 7/2013 | Miyazaki ........... H01M 2/1077 429/156 |
| 2014/0038029 A1* | 2/2014 | Thurmeier ......... H01M 2/1072 429/156 |
| 2015/0079458 A1 | 3/2015 | Maguire |
| 2016/0133898 A1* | 5/2016 | Choi ................... H01M 2/1077 429/151 |

FOREIGN PATENT DOCUMENTS

| CN | 2746545 | 12/2005 |
| CN | 20446348 U | * 7/2015 ............. H01M 2/10 |

OTHER PUBLICATIONS

Electric Subaru—Motive Battery Pack, retrieved from http://www.electricsubaru.com/battery.html.

* cited by examiner

*Primary Examiner* — Ula C Ruddock
*Assistant Examiner* — Tony S Chuo
(74) *Attorney, Agent, or Firm* — Carlson, Gaskey & Olds, P.C.

(57) ABSTRACT

An exemplary battery pack enclosure assembly includes a tensioning section that limits movement of a first enclosure side relative to a second enclosure side to resist expansion of at least one battery cell within a group of battery cells that are disposed along an axis between the first enclosure side and the second enclosure side.

18 Claims, 2 Drawing Sheets

TENSIONING BATTERY PACK ENCLOSURE

TECHNICAL FIELD

This disclosure relates to resisting expansion of battery cells. More particularly, this disclosure relates to an enclosure incorporating a tensioning section that limits relative movement of the enclosure to resist expansion of battery cells within the enclosure.

BACKGROUND

Electrified vehicles generally differ from conventional motor vehicles because electrified vehicles are selectively driven using one or more battery-powered electric machines. Conventional motor vehicles, in contrast to electrified vehicles, are driven exclusively using an internal combustion engine. The electric machines can drive the electrified vehicles instead of, or in addition to, an internal combustion engine. Example electrified vehicles include hybrid electric vehicles (HEVs), plug-in hybrid electric vehicles (PHEVs), fuel cell vehicles (FCVs), and battery electric vehicles (BEVs).

Traction batteries that power the electric machines can include one or more groups of battery cells within an enclosure. Over time, battery cells can expand and increase in size. The expanding battery cells can exert forces into the enclosure, which can potentially disrupt the structural integrity of the enclosure. In addition, expansion of the battery cells can adversely affect performance of the battery cells.

SUMMARY

A battery pack enclosure assembly according to an exemplary aspect of the present disclosure includes, among other things, a tensioning section that limits movement of a first enclosure side relative to a second enclosure side to resist expansion of at least one battery cell within a group of battery cells that are disposed along an axis between the first enclosure side and the second enclosure side.

In a further non-limiting embodiment of the foregoing assembly, the first enclosure side and the second enclosure side are axially facing.

In a further non-limiting embodiment of any of the foregoing assemblies, opposing axial ends of the tensioning section extend in a direction transverse to the axis to limit relative axial movement of the first and second sides.

In a further non-limiting embodiment of any of the foregoing assemblies, a bottom side connects the first side and the second side.

In a further non-limiting embodiment of any of the foregoing assemblies, the assembly includes a tensioning side that includes the tensioning section and a covering section. The tensioning side is aligned transversely to the first enclosure side and the second enclosure side.

In a further non-limiting embodiment of any of the foregoing assemblies, the tensioning section includes a first material composition, and the covering section includes a second material composition different than the first material composition.

In a further non-limiting embodiment of any of the foregoing assemblies, the tensioning section includes a metallic material, and the covering section includes a polymer material.

In a further non-limiting embodiment of any of the foregoing assemblies, the tensioning side is an enclosure lid.

In a further non-limiting embodiment of any of the foregoing assemblies, the covering section and the tensioning section are directly connected to each other.

In a further non-limiting embodiment of any of the foregoing assemblies, at least one of the tensioning section or the covering section includes an extension received within an aperture in the other of the tensioning section or the covering section to hold the tensioning section relative to the covering section.

A battery pack for an electrified vehicle according to another exemplary aspect of the present disclosure includes, among other things, an enclosure having a plurality of sides, a group of battery cells disposed along an axis and positioned axially between a first side of the plurality of sides and a second side of the plurality of sides, and a tensioning section secured to a tensioning side of the plurality of sides. The tensioning section extends axially from the first side to the second side and is configured to limit movement of the first side relative to the second side to resist expansion of at least one battery cell within the group of battery cells.

In a further non-limiting embodiment of the foregoing battery pack, the battery pack includes a bottom side connecting the first side to the second side.

In a further non-limiting embodiment of any of the foregoing battery packs, the enclosure provides an open area that receives the group of battery cells.

In a further non-limiting embodiment of any of the foregoing battery packs, the tensioning side includes the tensioning section and a covering section. The tensioning section has a first material composition, and the covering section has a second material composition different than the first material composition.

In a further non-limiting embodiment of any of the foregoing battery packs, the tensioning section includes a metallic material, and the covering section includes a polymer material.

A method of resisting expansion of a group of battery cells according to yet another exemplary aspect of the present disclosure includes, among other things, limiting movement of a first axially facing side of a battery pack enclosure relative to a second axially facing side of the battery pack enclosure using a tensioning section of a tensioning side of the battery pack enclosure.

In a further non-limiting embodiment of the foregoing method, the method includes molding a covering section of the tensioning side to secure the tensioning section to the covering section.

In a further non-limiting embodiment of any of the foregoing methods, the tensioning section includes a metallic material and the covering section includes a polymer material.

In a further non-limiting embodiment of any of the foregoing methods, the method includes positioning a group of battery cells axially between the first axially facing side and the second axially facing side.

In a further non-limiting embodiment of any of the foregoing methods, the limiting resists expansion of at least one battery cell within the group of battery cells.

BRIEF DESCRIPTION OF THE FIGURES

The various features and advantages of the disclosed examples will become apparent to those skilled in the art from the detailed description. The figures that accompany the detailed description can be briefly described as follows.

DETAILED DESCRIPTION

This disclosure relates generally to limiting expansion of battery cells in a battery pack of an electric vehicle. An enclosure of the battery pack includes a tensioning section to limit the expanding.

Figure 1:
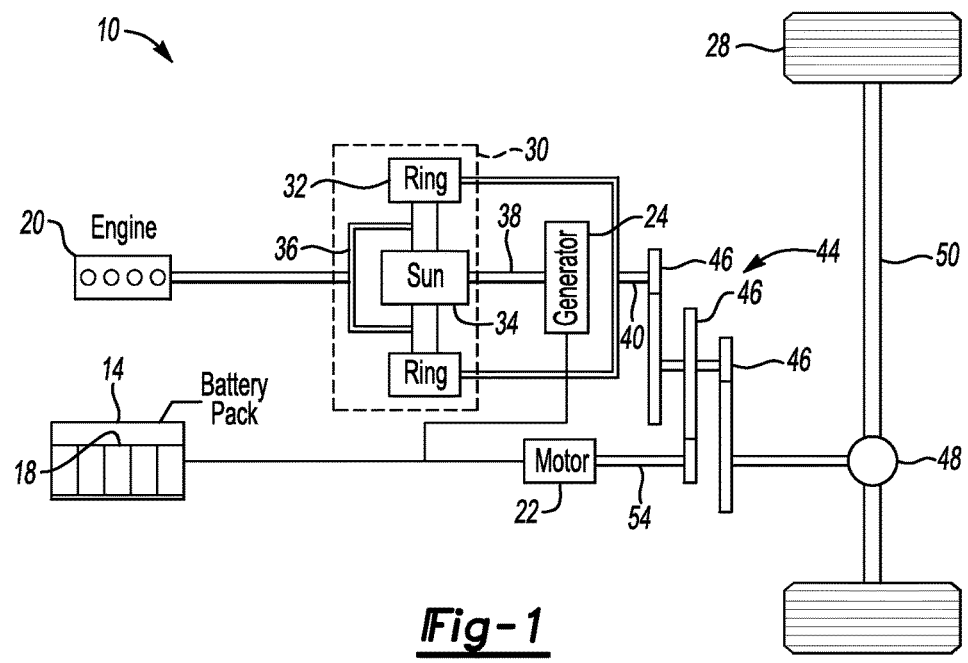
FIG. 1 illustrates a highly schematic view of a powertrain for an example electrified vehicle.

Referring to FIG. 1, a powertrain 10 of a hybrid electric vehicle (HEV) includes a battery pack 14 housing a group of battery cells 18. The powertrain 10 further includes an internal combustion engine 20, a motor 22, and a generator 24. The motor 22 and the generator 24 are types of electric machines. The motor 22 and generator 24 may be separate or have the form of a combined motor-generator.

In this embodiment, the powertrain 10 is a power-split powertrain that employs a first drive system and a second drive system. The first and second drive systems generate torque to drive one or more sets of vehicle drive wheels 28. The first drive system includes a combination of the engine 20 and the generator 24. The second drive system includes at least the motor 22, the generator 24, and the battery pack 14. The motor 22 and the generator 24 are portions of an electric drive system of the powertrain 10.

The engine 20 and the generator 24 can be connected through a power transfer unit 30, such as a planetary gear set. Of course, other types of power transfer units, including other gear sets and transmissions, can be used to connect the engine 20 to the generator 24. In one non-limiting embodiment, the power transfer unit 30 is a planetary gear set that includes a ring gear 32, a sun gear 34, and a carrier assembly 36.

The generator 24 can be driven by the engine 20 through the power transfer unit 30 to convert kinetic energy to electrical energy. The generator 24 can alternatively function as a motor to convert electrical energy into kinetic energy, thereby outputting torque to a shaft 38 connected to the power transfer unit 30.

The ring gear 32 of the power transfer unit 30 is connected to a shaft 40, which is connected to the vehicle drive wheels 28 through a second power transfer unit 44. The second power transfer unit 44 may include a gear set having a plurality of gears 46. Other power transfer units could be used in other examples.

The gears 46 transfer torque from the engine 20 to a differential 48 to ultimately provide traction to the vehicle drive wheels 28. The differential 48 may include a plurality of gears that enable the transfer of torque to the vehicle drive wheels 28. In this example, the second power transfer unit 44 is mechanically coupled to an axle 50 through the differential 48 to distribute torque to the vehicle drive wheels 28.

The motor 22 can be selectively employed to drive the vehicle drive wheels 28 by outputting torque to a shaft 54 that is also connected to the second power transfer unit 44. In this embodiment, the motor 22 and the generator 24 cooperate as part of a regenerative braking system in which both the motor 22 and the generator 24 can be employed as motors to output torque. For example, the motor 22 and the generator 24 can each output electrical power to recharge cells of the battery pack 14.

Figure 2:
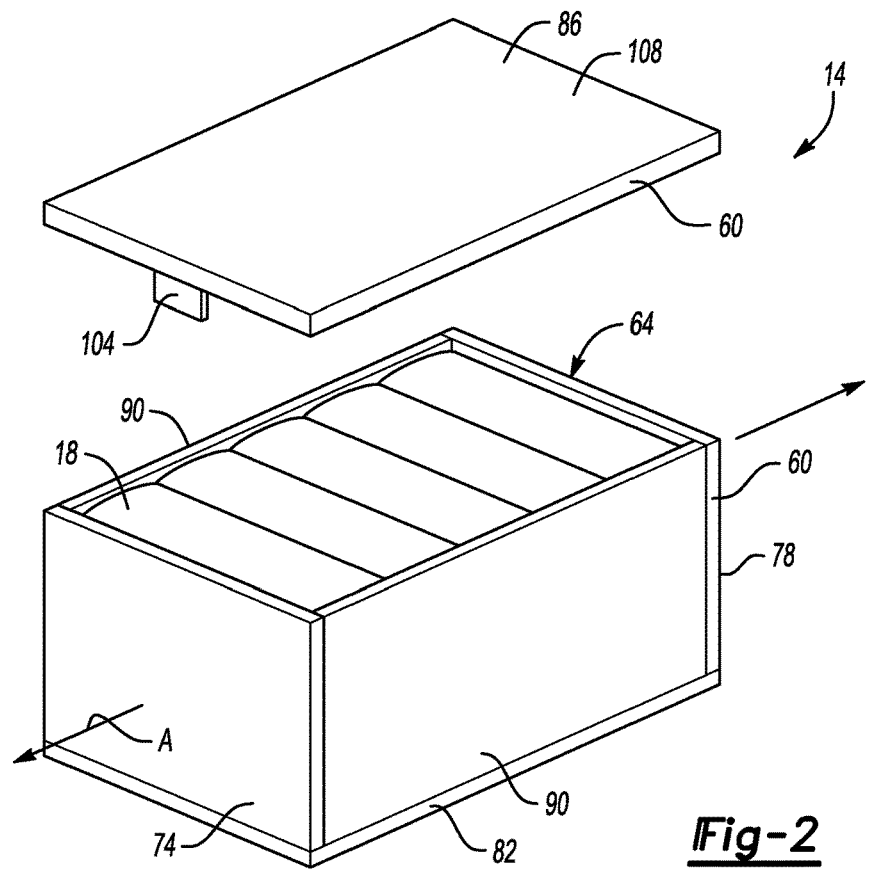
FIG. 2 illustrates a partially exploded view of an example battery pack suitable for use within the powertrain of FIG. 1.

Referring now to FIG. 2 with continuing reference to FIG. 1, an example of the battery pack 14 includes an enclosure 60 providing an open area 64 that receives the group of battery cells 18. The battery cells 18 are disposed along an axis A within the enclosure 60.

The group of battery cells 18 includes five of the battery cells 18 in this example, but could include more battery cells 18 or fewer battery cells 18.

The example enclosure 60 houses a single group of the battery cells 18 within the open area 64. In another example, more than one group of the battery cells 18 could be housed within the open area 64, such as another group of five battery cells 18 arranged along an axis perpendicular to the axis A.

In this example, the enclosure 60 is generally hexahedronal and thus includes, generally, six primary sides or faces. A first side 74 and a second side 78 of the enclosure 60 are axially facing sides. The battery cells 18 are positioned axially between the first side 74 and the second side 78. The enclosure further includes a bottom side 82, a tensioning side 86, and a pair of lateral sides 90.

The battery cells 18 are disposed upon the bottom side 82, which extends from the first side 74 to the second side 78. The bottom side 82 is secured to the first side 74 and the second side 78 using adhesive, welding, or mechanical fasteners, for example. The bottom side 82 thus connects the first side 74 to the second side 78.

The lateral sides 90 are adjacent the laterally outer edges of the battery cells 18. The lateral sides 90 extend axially from the first side 74 to the second side 78. The lateral sides 90 are secured to the first side 74 and the second side 78 using adhesive, welding, or mechanical fasteners, for example. The lateral sides 90 thus connect the first side 74 to the second side 78.

In this example, the first side 74, the second side 78, the bottom side 82, and the lateral sides 90 provide the open area 64 that receives the battery cells 18. The first side 74, the second side 78, the bottom side 82 are made of a metallic material such as aluminum in this example, but could be made of a polymeric material, or some combination of polymer and metallic materials that exhibit comparable tensile modulus and stiffness.

The tensioning side 86 provides an enclosure lid that covers the open area 64 to enclose the battery cells 18 within the open area 64 of the enclosure 60. The tensioning side 86 can be secured to the first side 74, the second side 78, and the bottom side 82 using an adhesive, mechanical fasteners, welding, or some other attachment strategy. Interfaces between the tensioning side 86 and the remaining portions of the enclosure 60 can be either liquid-sealed or air-sealed using a rubber gasket or sealant.

The first side 74, the second side 78, the bottom side 82, the tensioning side 86, and the lateral sides 90 are shown as separate sides in this example, but could be formed in combination with one or more of the other sides. That is, the first side 74, the second side 78, the bottom side 82, and the lateral sides 90 could be molded or cast together as a single continuous and uninterrupted structure. Further, the first side 74, the second side 78, and the lateral sides 90 could be molded or cast together, and the bottom side 82 then secured to downwardly facing surfaces of the first side 74, the second side 78, and the lateral sides 90. Even further, the lateral sides 90 and the bottom side 82 could be extruded as a continuous profile. In this case, such profile would be secured to axially facing surfaces of the first side 74 and the second side 78.

Figure 3:
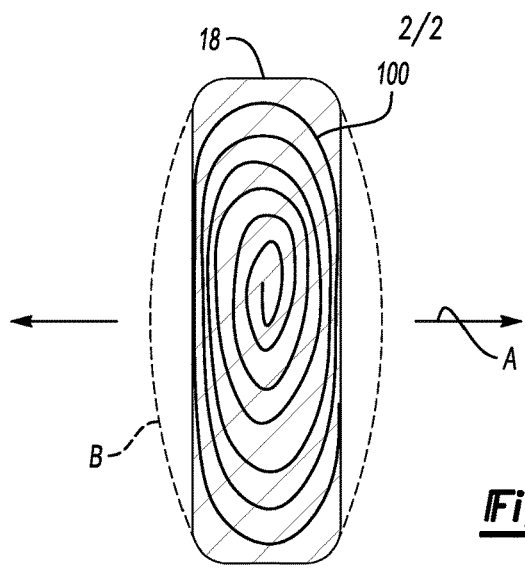
FIG. 3 illustrates a section view of a battery cell from the battery pack of FIG. 2.

Referring now to FIG. 3 with continuing reference to FIG. 2, the battery cells 18 are prismatic cells in this example. The battery cells 18 could be pouch cells or another type of battery cells in another example.

The example battery cells 18 include an electrode structure 100 that is folded and wound about an axis that extends laterally relative to the axis A. The electrode structure 100 can be referred to as a jelly-roll type electrode.

If not constrained, the battery cells 18 can tend to expand and increase in thickness over time as is known. Due to the electrode structure 100, expansion of the battery cells 18 tends to occur primarily in a direction aligned with the axis A. An exemplary substantially unrestricted expansion of the battery cell 18 is represented by broken lines B in FIG. 3.

Within the enclosure 60, forces due to expansion of the battery cells 18 urge the first side 74 and the second side 78 axially away from each other. If not adequately resisted, forces due to expansion of the battery cells 18 can undesirably strain and weaken the enclosure 60. Forces due to expansion of the battery cells 18 can lead to undesirable leak paths from the open area 64, for example. The example enclosure 60 limits movement of the first side 74 relative to the second side 78 to resist expansion of one or more of the battery cells 18.

Figure 4:
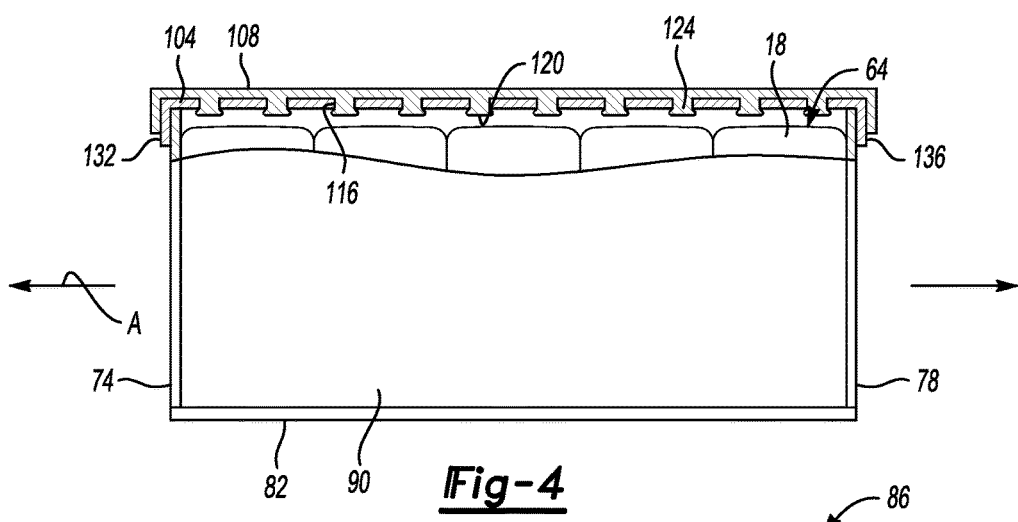
FIG. 4 illustrates a partially sectioned view of the battery pack of FIG. 2.
Figure 5:
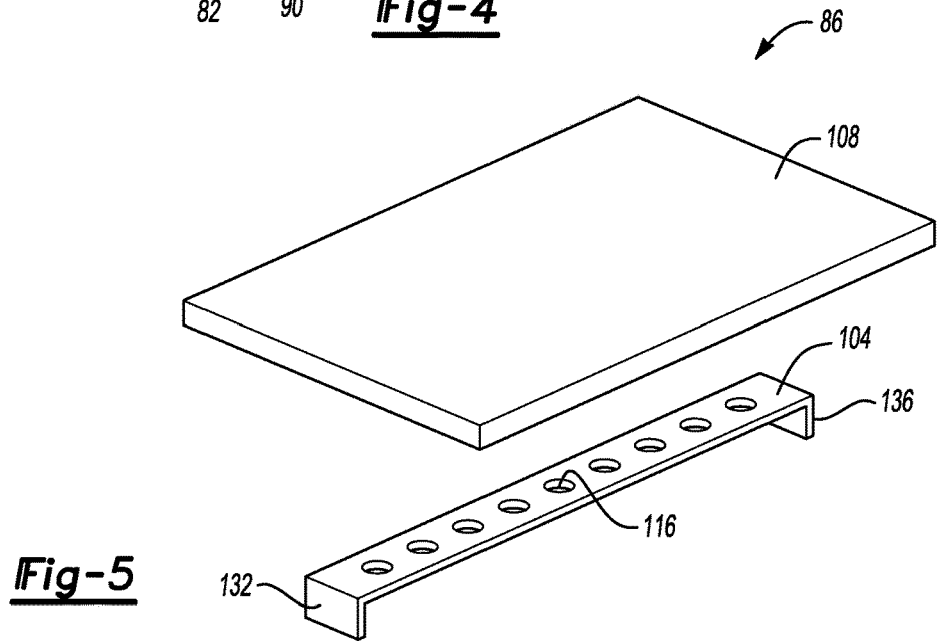
FIG. 5 illustrates an exploded view of a tensioning side of an enclosure from the battery pack of FIG. 2.

Referring now to FIGS. 4 and 5 with continuing reference to FIGS. 2 and 3, the example enclosure 60 resists expansion using a tensioning section 104 that is incorporated into the tensioning side 86 of the enclosure.

Portions of the tensioning side 86 other than the tensioning section 104 are, in this example, referred to as a covering section 108. The primary function of the tensioning section 104 is to resist movement of the first side 74 away from the second side 78. The primary function of the covering section 108 is to cover the open area 64 to enclose the battery cells 18 within the enclosure 60.

In this example, the tensioning section 104 is directly secured to the covering section 108. The example covering section 108 is a molded, primarily polymer material, and the example tensioning section 104 is a primarily metallic material.

The tensioning section 104 includes a plurality of apertures 116 distributed along an axis aligned with the axis A when the tensioning side 86 is covering the open area 64. When molding the covering section 108, the tensioning section 104 is placed into a mold before molding the covering section 108. As the covering section 108 is molded, the polymer material flows through the apertures 116 and is constrained by the mold on an opposing side of the tensioning section 104 to form an head 120 or button that is enlarged relative to a diameter of the apertures 116. The head 120 connects to the remaining portions of the covering section 108 via an extension 124, which is a portion of the covering section 108 extending through the apertures 116 to the head 120. The head 120 limits movement of the tensioning section 104 away from the covering section 108 when the covering section 108 has cured and is removed from the mold.

In another example, the tensioning section 104 includes a head, an extension or both that are held within apertures of the covering section 108 to directly connect the tensioning section to the covering section 108.

In another example, mechanical fasteners, adhesive, etc. are used to directly connect the tensioning section 104 to the covering section 108.

The tensioning section 104 includes a first flange 132 and a second flange 136 extending from the remaining portions of the tensioning section 104 in a direction that is transverse to the axis A. The first flange 132 is positioned at a first axial end of the tensioning section 104. The second flange 136 is positioned at a second axial end of the tensioning section 104.

When the tensioning side 86 is covering the open area 64, the first flange 132 is positioned against an outwardly facing surface of the first side 74, and the second flange 136 is positioned against an outwardly facing surface of the second side 78. The first flange 132 and the second flange 136 limit movement of the first side 74 away from the second side 78, which restricts axial expansion of the battery cells 18. The tensioning section 104 thus acts as a tension member that restricts axial expansion of the battery cells 18, which can be due to expansion of the battery cells 18.

The first flange 132 and the second flange 136 of the tensioning section 104 resist expansion of the battery cells 18 in this example. In another example, the first flange 132 and the second flange 136 could be omitted and a fastener could be used to secure opposing axial ends of the tensioning section 104 to the upwardly facing surface of the first side 74 and the second side 78, respectively.

The tensioning section 104 has a first material composition, and the covering section 108 has a second material composition. The first material composition is stronger in tension than the second material composition.

In this example, the tensioning section 104 is a steel material. In another example, this tensioning section 104 is an aluminum. Incorporating these materials as the tensioning section 104 rather than the covering section 108 can, among other things, reduce material costs.

Although the tensioning section 104 is metallic in this example, another example may include a tensioning section that is non-metallic, but stronger under tension than a material making up the covering section 108.

For example, an area of the tensioning side 86 could be made of a unidirectional glass tape or fabric that is formed with, or embedded into, the remaining portions of the tensioning side 86 when manufacturing the tensioning side 86. In such an example, the area of the tensioning side 86 provides a tensioning section.

The example tensioning section 104 is shown secured to an underside of the covering section 108 in this example. In another example, the tensioning section 104 could be secured to an outwardly facing surface of the covering section 108.

The tensioning section 104 is incorporated into the portion of the enclosure 60 provides an enclosure lid in this example. In another example, the tensioning section 104 is incorporated into another side of the enclosure 60 such as the bottom side 82 or the lateral sides 90.

Features of the disclosed examples include an enclosure side incorporating a tensioning section. The tensioning section enables the side to have reduced weight relative to sides formed primarily of other materials, such as steel.

Manufacturing a covering section from a material that is different from a tensioning section can provide a designer with more complex design choices that are more cost effective, more easily manufacturable, and lighter weight than prior art designs.

The preceding description is exemplary rather than limiting in nature. Variations and modifications to the disclosed examples may become apparent to those skilled in the art that do not necessarily depart from the essence of this disclosure. Thus, the scope of legal protection given to this disclosure can only be determined by studying the following claims.

What is claimed is:

1. A battery pack enclosure assembly, comprising:
   an enclosure that encloses a group of battery cells within an open area, the enclosure including a first enclosure side and a second enclosure side;
   a tensioning section that limits movement of the first enclosure side relative to the second enclosure side to resist expansion of at least one battery cell within the group of battery cells that are disposed along an axis between the first enclosure side and the second enclosure side;
   a tensioning side that includes the tensioning section and a covering section, the tensioning side aligned transversely to the first enclosure side and the second enclosure side; and
   an extension that is part of at least one of the tensioning section or the covering section, the extension received within an aperture in the other of the tensioning section or the covering section to directly connect the tensioning section and the covering section.

2. The battery pack enclosure assembly of claim 1, wherein opposing axial ends of the tensioning section extend in a direction transverse to the axis to limit relative axial movement of the first and second sides.

3. The battery pack enclosure assembly of claim 1, wherein a bottom side of the enclosure is directly connected to both the first enclosure side and the second enclosure side.

4. The battery pack enclosure assembly of claim 1, wherein the tensioning section comprises a first material composition, and the covering section comprises a second material composition different than the first material composition.

5. The battery pack enclosure assembly of claim 1, wherein the tensioning section comprises a metallic material, and the covering section comprises a polymer material wherein at least one of the tensioning section or the covering section includes an extension received within an aperture in the other of the tensioning section or the covering section to hold the tensioning section relative to the covering section.

6. The battery pack enclosure assembly of claim 1, wherein the tensioning side is an enclosure lid that covers the open area.

7. The battery pack enclosure assembly of claim 1, wherein the enclosure completely encloses the group of battery cells.

8. The battery pack enclosure assembly of claim 1, wherein the enclosure covers all sides of the group of battery cells.

9. The battery pack enclosure assembly of claim 1, wherein the covering section is overmolded to the tensioning section to directly connect together the covering section and the tensioning section.

10. The battery pack enclosure assembly of claim 8, wherein the enclosure lid is separate and distinct from the first enclosure side and the second enclosure side.

11. A battery pack for an electrified vehicle, comprising:
    an enclosure having a plurality of sides;
    a group of battery cells disposed along an axis and positioned axially between a first side of the plurality of sides and a second side of the plurality of sides, the group of battery cells enclosed within an open area of the enclosure; and
    a tensioning section secured to a tensioning side of the plurality of sides, the tensioning section extending axially from the first side to the second side and configured to limit movement of the first side relative to the second side to resist expansion of at least one battery cell within the group of battery cells,
    the tensioning side including the tensioning section and a covering section; and
    an extension that is part of at least one of the tensioning section or the covering section, the extension received within an aperture in the other of the tensioning section or the covering section to directly connect the tensioning section and the covering section.

12. The battery pack of claim 11, further comprising a bottom side directly joined to both the first side and the second side to connect the first side to the second side.

13. The battery pack of claim 11, wherein the tensioning side comprises the tensioning section and a covering section, the tensioning section having a first material composition, and the covering section having a second material composition different than the first material composition.

14. The battery pack of claim 13, wherein the tensioning section comprises a metallic material, and the covering section comprises a polymer material.

15. The battery pack of claim 11, wherein all sides of the group of battery cells are covered by at least one of the plurality of sides of the enclosure.

16. An enclosure, comprising:
    a tensioning section of an enclosure;
    a covering section covering an open area of the enclosure to completely enclose at least one battery cell within the open area, the tensioning section limiting movement of a first enclosure side relative to a second enclosure side to resist expansion of the at least one battery cell; and
    an extension that is part of at least one of the tensioning section or the covering section, the extension received within an aperture in the other of the tensioning section or the covering section to directly connect the tensioning section and the covering section.

17. The enclosure of claim 16, wherein the covering section is overmolded to the tensioning section.

18. The enclosure of claim 16, wherein the at least one battery cell comprises a group of battery cells disposed along an axis, and opposing axial ends of the tensioning section extend in a direction transverse to the axis to limit relative axial movement of the first and second enclosure sides.

* * * * *

UNITED STATES PATENT AND TRADEMARK OFFICE
CERTIFICATE OF CORRECTION

PATENT NO. : 9,966,582 B2
APPLICATION NO. : 14/805891
DATED : May 8, 2018
INVENTOR(S) : Hyung Min Baek and Sai K. Perumalla Page 1 of 1

It is certified that error appears in the above-identified patent and that said Letters Patent is hereby corrected as shown below:

In the Claims

In Claim 10, Column 7, Line 56; before "enclosure assembly of" replace "claim 8," with --claim 6,--

Signed and Sealed this
Twenty-first Day of August, 2018

Andrei Iancu
*Director of the United States Patent and Trademark Office*